Figure 1:
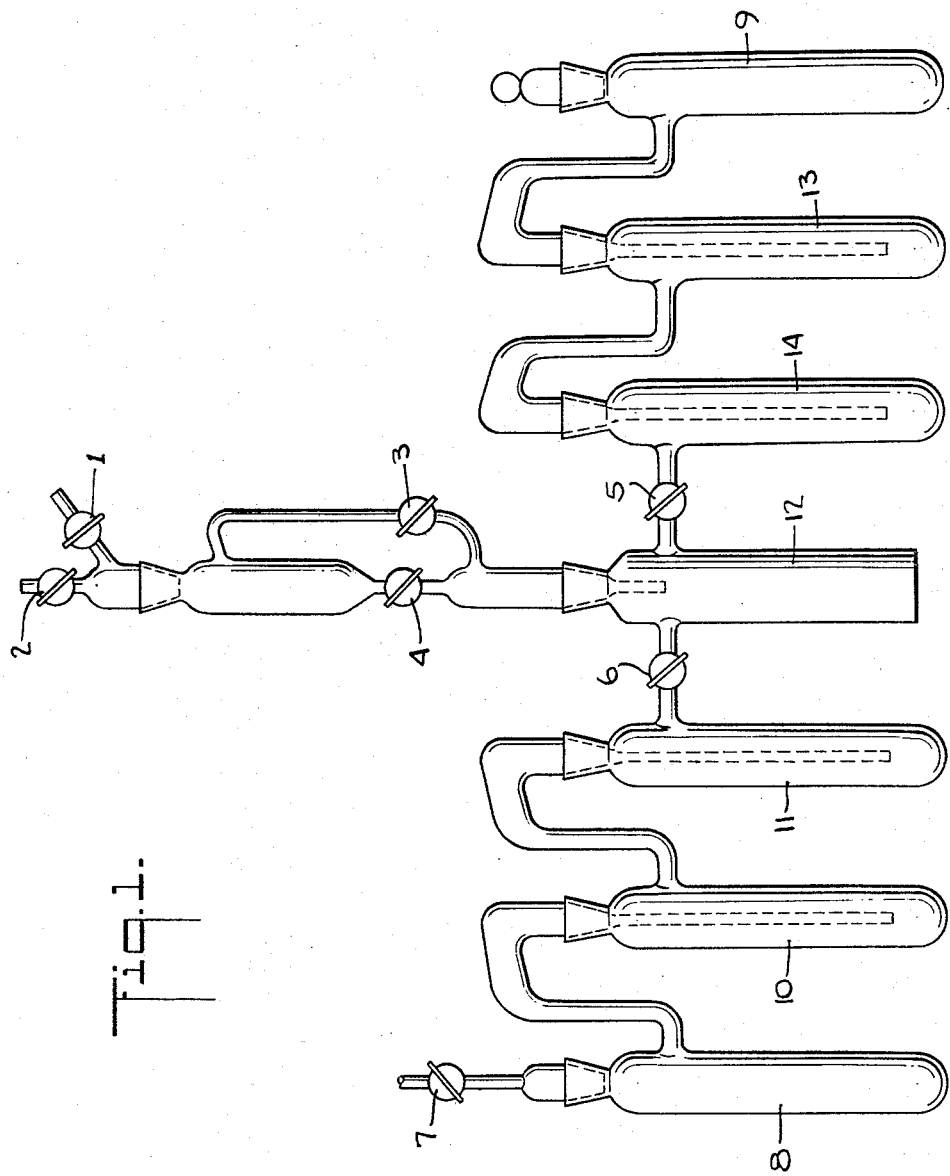

INVENTOR.
HERMAN F. MARK
BY
[signature] M. H. Radde
AGENT

INVENTOR.
HERMAN F. MARK

BY Erich M. H. Radde

AGENT 3,296,209
COPOLYMERIZATION PRODUCTS OF CARBONYL COMPOUNDS AND CYCLIC IMINES AND PROCESSES OF MAKING SAME
Herman F. Mark, Brooklyn, N.Y., assignor to Chemirad Corporation, Brunswick, N.J., a corporation of Delaware
Filed July 21, 1966, Ser. No. 568,702
11 Claims. (Cl. 260—67.5)

This invention is a continuation-in-part of my copending application Ser. No. 115,668 for Copolymerization Products of Carbonyl Compounds and Cyclic Imines and Processes of Making and Using Same, filed June 8, 1961 now forfeited.

This invention relates to copolymerization products of carbonyl compounds and cyclic imines having the formula:

(1) $\{CRH(CH_2)_nCHR'NH(CHR\text{—}O)_y\}_z$ where R and R' are selected from the class consisting of hydrogen, lower alkyl radicals, phenyl radicals, and substituted alkyl and phenyl radicals; $n$ is a number from 0 to 4, $y$ is a number from 1 to 199, and $z$ is at least 32. More particularly, this invention relates to copolymerization products of formaldehyde and ethylene imine having the formula:

(2) $\{CH_2CH_2NH(CH_2O)_y\}_z$ where $y$ and $z$ are as defined above. Further this invention relates to the processes of making and using the above-mentioned compounds.

Reaction products of carbonyl compounds and alkylene imines in the presence of condensing agents are known. The resulting products are low-molecular, water soluble condensation products.

It is also known to polymerize aldehydes, such as formaldehyde, through the splitting of the carbon-oxygen double bond to form materials of very high molecular weight. The resulting polymerization products range from hard and rigid resins as they are obtained, for instance, by polymerization of formaldehyde, to soft and extensible rubbers, as produced by polymerization of acetaldehyde.

It is furthermore known to polymerize ethylene imine through the opening of the ring to form polymerization products of moderately high molecular weight.

Heretofore, however, it has not been possible to prepare copolymerization products, in macromolecular form, which contain in the polymer chain units formed from the cyclic imine and from the aldehyde. For example, a product has been shown having the formula:

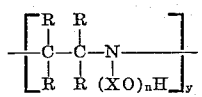

where R there represents hydrogen and alkyl radicals and X is a bivalent hydrocarbon group. Such a product, because of the branching, is not easily susceptible to forming by extrusion. Such branches interfere with such a forming process. On the other hand, the products of the present invention, being essentially linear materials can be drawn into fibers, extruded, or otherwise molded. Further, the linear structure of the present polymer provides the possibility for hydrogen bonding, thus providing cohesive strength, and further providing a stronger polymer than one having pendant chains, as does the polymer of the prior art. Additional strength is also provided in the polymer of the present invention because it crystallizes more readily.

It is one object of the present invention to provide such new copolymerization products of polymerizable carbonyl compounds and cyclic imines which have structural units in their polymer chain consisting of units of polymer carbonyl compounds and polymer units formed from cyclic imines and which have a high molecular weight and interesting properties permitting their useful application in many fields of industry.

Another object of the present invention is to provide a simple and effective process of producing such copolymerization products of carbonyl compounds and more particularly of aldehydes and cyclic imines.

Still another object of the present invention is to provide compositions and preparations containing new and valuable copolymerization products of carbonyl compounds and more particularly of aldehydes and cyclic imines which are useful for many applications.

Still another object of the present invention is to provide a process of using such compositions and preparations containing copolymerization products of carbonyl compounds and more particularly of aldehydes and cyclic imines in many fields of industry.

Other objects of the present invention and advantageous features thereof will become apparent as the description proceeds.

The formation of the polymers of the present invention is accomplished by copolymerizing compounds of the formula:

(3) $\qquad RHC=O$ with compounds of the formula:

(4) 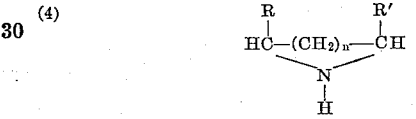

where R, R', and $n$ are as previously defined. In particular, R and R' can be methyl, ethyl, phenyl, chlorophenyl, and the like.

The preferred reactants, in accordance with the present invention, are formaldehyde, corresponding to generic Formula 3 where R is hydrogen, and ethylene imine, corresponding to Formula 4 where R and R' are hydrogen, and $n$ is 0. It should, of course, be understood that this invention is not limited to these preferred compounds.

The resulting copolymerization products of the aldehydes of Formula 3 and cyclic imines of Formula 4 have molecular weights of at least 10,000, preferably molecular weights above 20,000. The molar proportion of the two monomeric components may vary widely, but there should preferably be from 1 to 199 moles of the aldehyde for each mole of the cyclic imine, that is, a molar percentage of the polymerized cyclic imine of between 0.5 and 50 percent. More preferably, the molar percentage of the polymerized cyclic imine varies from about 10 to 30 percent.

It is an essential feature of the present invention to employ monomers of a very high degree of purity in the copolymerization process. The presence of even small amounts of impurities in the monomers prevents or at least impedes copolymerization and yields unsatisfactory copolymers. Impurities which are especially harmful and which should be substantially completely removed, are compounds which contain a hydroxyl group or a reactive hydrogen atom. The contents of such impurities in the reactants should not exceed about 20 parts per million. Examples of impurities which must be excluded during copolymerization are water, lower alcohols, acetic acid, acetylene, ammonia, and urea.

Copolymerization is carried out in the presence of a suitable solvent or diluent. This solvent or diluent can be an aliphatic or aromatic hydrocarbon or a cyclic ether, generally, any organic solvent which is inert to the reactants under the conditions of reaction. Preferred solvents are hexane, heptane, isooctane, benzene, or xylene.

Catalytically active substances and particularly anionic catalysts are especially suitable. These anionic catalysts should be selected from the class consisting of lithium alkyl, lithium aryl, aluminum alkyl and lithium aluminum hydride. Cationic catalysts apparently are not suitable for polymerization because they retard polymerization due to salt formation between the acid catalyst and the cyclic imine. The catalyst may be added to the reaction mixture in concentrated form although the preferred procedure is to add it in the form of a solution in the organic solvent used as diluent.

Copolymerization is carried out at a temperature between about $-80°$ C. and about $+80°$ C. and preferably between $-40°$ C. and $+40°$ C. Copolymerization may be effected in a vacuum as well as at atmospheric pressure and at increased pressure. The total pressure of the volatile components may be from 0.1 atm. to 100 atm. and is preferably between 1 atm. and 10 atm.

As stated hereinabove, it is an essential feature of the present invention that all the reactants, i.e. the monomers, the solvents, and the catalysts used are of a high degree of purity. To achieve such a reaction with high grade reactants etc., an apparatus is preferably used as it is illustrated in FIG. 1 of the attached drawings.

The two flasks 8 and 9 are used to store the already purified monomers for the reaction. The entire apparatus system is flushed with dry prepurified nitrogen for 20 minutes while the monomers remain cooled to liquid air temperature. It is then degassed under a vacuum below 0.01 mm. Hg for one hour and brought back to atmospheric pressure by closing stopcock 7 and reintroducing nitrogen through stopcock 1. Under a slight positive nitrogen pressure stopcock 2 is opened and the catalyst solution is added to the dropping funnel through stopcock 2 by means of a hypodermic syringe. The system is then partially sealed for distillation of the monomers by closing stopcocks 1, 2, and 3. After re-evacuating the apparatus to a vacuum below 0.01 mm. Hg, stopcock 7 is closed and the cooling bath is transferred from flask 8 to flask 10. The one monomer X, for instance, the formaldehyde is slowly distilled into flask 10. This distillation process is repeated to distill the monomer X from flask 10 to flask 11 and again from flask 11 into the reaction flask 12 by successive transfer of the cooling bath. Stopcock 6 is then closed. The distillation of the second monomer Y is carried out in a similar fashion from flask 9 to flask 13, then to flask 14, and finally into the reaction flask 12. At the completion of the distillation process stopcock 5 is closed, the solution is stirred by means of a magnetic stirrer, and the catalyst is added through stopcock 4.

Although such an apparatus has successfully been used in the copolymerization of aldehydes and cyclic imines it is, of course, understood that purification of the starting monomers may be effected in a different manner and also previously to the polymerization.

The following examples serve to illustrate the present invention without, however, being limited thereto.

*Example 1*

43.2 g. of high purity ethylene imine were distilled in an apparatus of the type described in FIG. 1 into 55 ml. of dry, pure heptane. After completion of this distillation process, 30.5 g. of high purity formaldehyde were added by high vacuum distillation from the other side of the apparatus. The solution was kept at $-75°$ C. and was gently stirred by means of a magnetic stirrer. 1.3 g. (0.02 mole) of butyl lithium (based on the amount of formaldehyde monomer) dissolved in 25 ml. of heptane are slowly added to the mixture within about 40 minutes. As soon as a droplet of the catalyst solution hits the solution of the two monomers, a haze of polymer immediately appears and is equally quickly dissipated by the stirring action. The reaction is strongly exothermic but can be kept under complete control by sufficiently slow addition of the catalyst solution so that the temperature remains between $-75°$ C. and $-70°$ C. After addition of the last droplet of catalyst solution, stirring is continued at $-50°$ C. for another 30 minutes, whereby virtually quantitative conversion of the two monomers into the copolymer is achieved. The copolymerization mixture is a hazy suspension of the reaction product in heptane. Its temperature is allowed to increase to room temperature. The precipitate is filtered off, washed repeatedly with cold ether, and dried, first in air and finally in a vacuum at room temperature.

Figure 2:
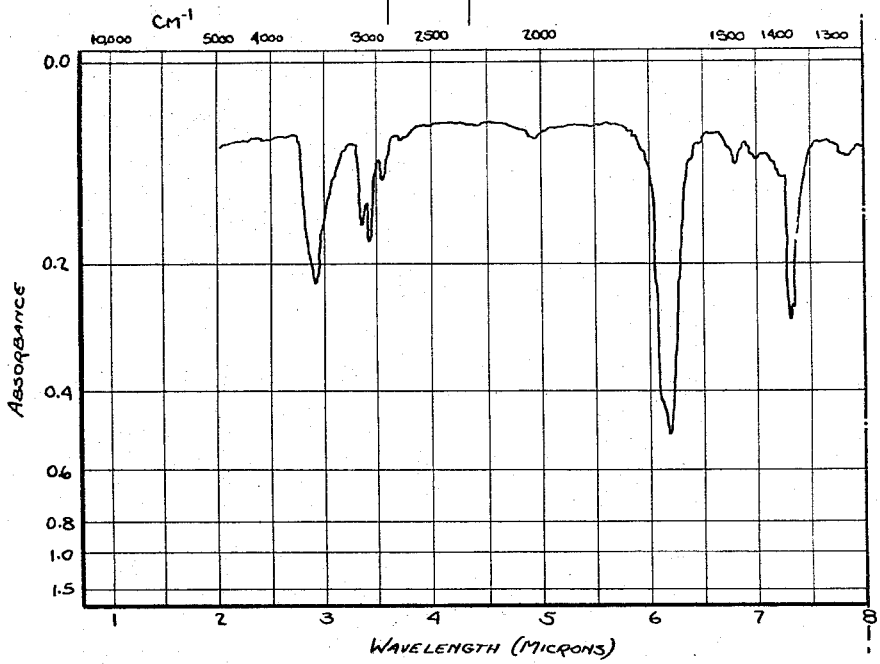
Figure 2:
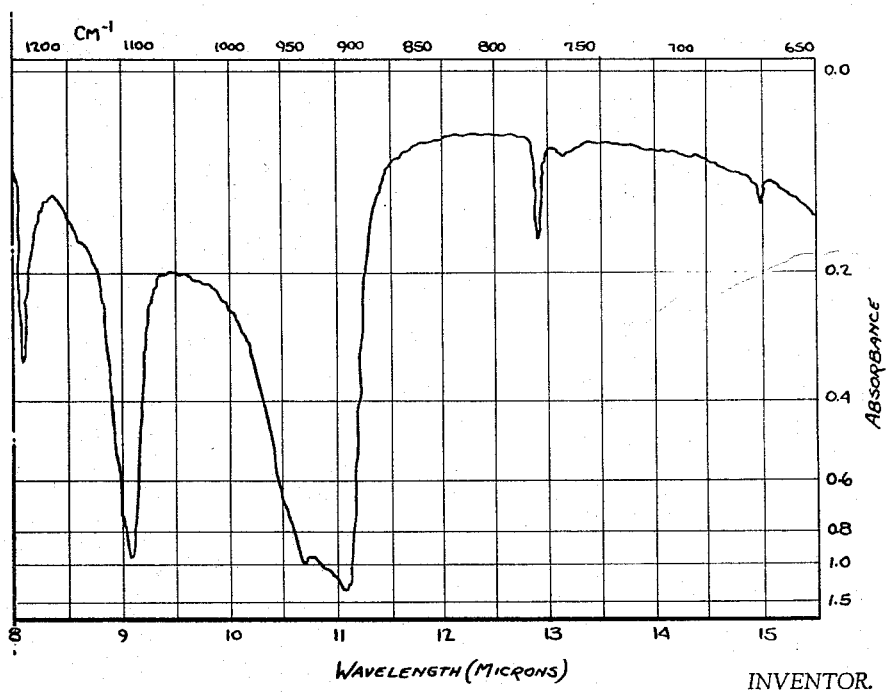

A quantity of 40 g. of a white, soft amorphous product was obtained. Analysis showed this product to have a nitrogen content of 12.2 percent and a molecular weight of 26,000. Further testing showed the copolymer to be soluble in water at elevated temperatures and at low pH-values, but the copolymer is precipitated by the addition of alkali metal hydroxides to an aqueous solution. Further, an infra-red spectrum was run of the copolymerization products, as shown in FIG. 2. In addition to the peaks expected for an oxymethylene chain, the copolymer showed peaks at just below 3 microns, 9 microns, and 13 microns, indicative of —NH— and —C—N—C— groups, all nitrogen containing links. The slight shift from the absorption frequencies of a secondary amine can be explained in terms of the effect of the neighboring groups in the copolymer.

The combination of the nitrogen percentage, the molecular weight, and the infra-red spectrum, confirm an approximate average formula:

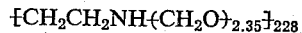

corresponding to Formula 1 where R and R' are hydrogen, $n$ is 0, $y$ is 2.35 and $z$ is 228. This also corresponds to Formula 2 where $y$ is 2.35 and $z$ is 228.

The resulting copolymer is an excellent adhesive and forms very stable chelate type compounds with heavy metal salts. It can be cast into filaments which subsequently can be cured through the reactivity of the hydrogen atoms at the imine groups.

The resulting copolymer can be spun to filaments from a 25 percent to 30 percent solution thereof in dimethyl sulfoxide or dimethyl formamide at 145° C. The resulting filaments are drawn to a ratio of 6:1 and the remaining solvent is removed by washing in water at 30° C. The fibers are cured after swelling in a cross linking agent, for instance, in a solution of maleic acid anhydride at a temperature of 75° C. within about 5 minutes to 10 minutes.

Copolymerization products of formaldehyde and ethylene imine of a low imine content, for instance, of an imine content between about 0.5 mole percent and about 5 mole percent, and of a high degree of polymerization, for instance, of a degree of polymerization exceeding about 800, are plastic masses which are similar in their appearance and properties to the polymerization products obtained from formaldehyde alone. However, the new copolymerization products have an advantage over previous formaldehyde polymerization products in that they have improved dyeability. Additionally, they can be cross linked and are curable with anhydrides of polycarboxylic acids. At a higher imine content, for instance, at an imine content exceeding about 10 mole percent, and at a degree of polymerization below 500, the resulting copolymerization products are water soluble resins which can be used as detergents, adhesives, protective colloids, and for many other purposes.

In place of formaldehyde, there may also be employed other aldehydes, such as acetaldehyde, crotonaldehyde, or mixtures thereof. These aldehydes can also be copolymerized with cyclic imines and especially with ethylene imine by proceeding in the manner described hereinafter.

The preferred cyclic imine used in the copolymerization process according to the present invention is ethylene imine. Other cyclic imines which may be employed are, for instance, 1,2-propylene imine, 1,2-butylene imine, 2,3-butylene imine, 1,1-dimethyl ethylene imine, 1-butyl ethylene imine, and other 1,2-alkylene imines, 1-phenyl ethylene imine, or 1,3-propylene imine, and others.

The following further examples illustrate the preparation of other copolymers according to the present invention.

*Example 2*

59.6 g. of high purity propylene imine were distilled in an apparatus of the type described in FIG. 1 into 68 ml. of pure dry isoctane. After completion of this distillation process, 32.5 g. of high purity formaldehyde were added by high vacuum distillation from the other side of the apparatus. The solution was kept at —33° C. and was gently stirred by means of a magnetic stirrer, 1.8 g. of amyl sodium (based on the amount of formaldehyde monomer) dissolved in 18 ml. of isoctane are slowly added to the mixture within about 30 minutes. As soon as a droplet of the catalyst solution hits the solution of the two monomers, a haze of polymer immediately appears and is equally quickly dissipated by the stirring action. The reaction is strongly exothermic but can be kept under complete control by sufficiently slow addition of the catalyst solution so that the temperature remains between —35° C. and —30° C. After addition of the last droplet of catalyst solution, stirring is continued at —30° C. for another 30 minutes, whereby conversion of the two monomers into the copolymer is achieved. The copolymerization mixture is a hazy suspension of the reaction product in isoctane. Its temperature is allowed to increase to room temperature. The precipitate is filtered off, washed repeatedly with cold ether, and dried, first in air and finally in a vacuum at room temperature. 47.2 g. of a white, soft amorphous product of a nitrogen content of 9.4 percent and a molecular weight of 31,000 are obtained. This shows a copolymeric product having the approximate average formula:

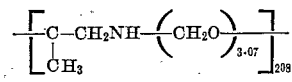

which is equivalent to Formula 1 where one R is methyl, the other R and R' being hydrogen, n is 0, y is 3.07, and z is 208.

*Example 3*

66.5 g. of high purity butylene imine were distilled in an apparatus of the type described in FIG. 1 into 65 ml. of pure dry benzene. After completion of this distillation process, 34.6 g. of high purity acetaldehyde were added by high vacuum distillation from the other side of the apparatus. The solution was kept at —38° C. and was gently stirred by means of a magnetic stirrer; 2.9 g. of triethyl aluminum in 25 ml. benzene are slowly added to the mixture within about 20 minutes. As soon as a droplet of the catalyst solution hits the solution of the two monomers, a haze of polymer immediately appears and is equally quickly dissipated by the stirring action. The reaction is strongly exothermic but can be kept under complete control by sufficiently slow addition of the catalyst solution so that the temperature remains between —35° C. and —30° C. After addition of the last droplet of catalyst solution, stirring is contained at —30° C. for another 30 minutes, whereby conversion of the two monomers into the copolymer is achieved. The copolymerization mixture is a hazy suspension of the reaction product in benzene. Its temperature is allowed to increase to room temperature. The precipitate is filtered off, washed repeatedly with cold ether, and dried, first in air and finally in a vacuum at room temperature. 60.2 g. of a white rubbery amorphous product of a nitrogen content of 6.2 percent and a molecular weight of 43,000 are obtained. This shows a copolymeric product of the approximate average formula:

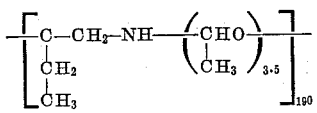

which is the equivalent of Formula 1 where one R is ethyl, the other R is methyl, R' is hydrogen, n is 0, y is 3.5, and z is 190.

*Example 4*

43.2 g. of high purity ethylene imine were distilled in an apparatus of the type described in FIG. 1 into 75 ml. of pure dry tetrahydrofuran. After completion of this distillation process, 65.4 g. of benzaldehyde were added by high vacuum distillation from the other side of the apparatus. The solution was kept at 36° C. and was gently stirred by means of a magnetic stirrer, 1.2 g. of lithium aluminum hydride dissolved in 15 ml. of benzene or as dry powder are slowly added to the mixture within about 45 minutes. As soon as a droplet of the catalyst solution hits the solution of the two monomers, a haze of polymer immediately appears and is equally quickly dissipated by the stirring action. The reaction is strongly exothermic but can be kept under complete control by sufficiently slow addition of the catalyst solution so that the temperature remains between +35° C. and +40° C. After addition of the last droplet of catalyst solution, stirring is continued at +50° C. for another 30 minutes, whereby conversion of the two monomers into the copolymer is achieved. The copolymerization mixture is a hazy suspension of the reaction product in the solvents. Its temperature is allowed to decrease to room temperature. The precipitate is filtered off, washed repeatedly with cold ether, and dried, first in air and finally in a vacuum at room temperature. 75.4 g. of a hard resinous product of a nitrogen content of 4.8 percent and a molecular weight of 45,500 are obtained. This shows a copolymeric product of the approximate average formula:

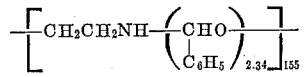

which is equivalent to Formula 1 where one R is hydrogen, the other R is phenyl, R' is hydrogen, n is 0, y is 2.34, and z is 155.

The copolymers according to the present invention are soluble in many organic solvents such as alcohols, ketones, acid amides, chlorinated aliphatic and aromatic hydrocarbons, and in acidic aqueous solutions; they all give an amorphous X-ray diagram and have softening points between about 20° C. and about 150° C. Their densities range between 1.38 and 1.52; the viscosities of their solutions depend on molecular weight and concentration; intrinsic viscosities (at 25° C. in the best available solvent) range from 1.2 to 6.5.

*Example 5*

Example 1 is repeated, but employing the ethylene imine and formaldehyde in such ratios as to produce a polymer having a nitrogen content of 5 percent and a molecular weight of about 35,000. This corresponds to a copolymer having the approximate average formula:

which corresponds to Formula 1 where R and R' are hydrogen, n is 0, y is 8, and z is 124, and to the polymer of Formula 2 where y is 8 and z is 124. This polymer has the advantage of being dyeable and of being cross-linkable by anhydrides of polycarboxylic acids.

*Example 6*

Example 1 is repeated, but employing the ethylene imine and formaldehyde in such ratios as to produce a polymer having a nitrogen content of 1.4 percent and a molecular weight of about 40,000. This corresponds to a copolymer having the approximate average formula:

$$[CH_2CH_2NH(CH_2O)_{32}]_{40}$$

which corresponds to Formula 1 where R and R' are hydrogen, $n$ is 0, $y$ is 32 and $z$ is 40, and to the copolymer of Formula 2 where $y$ is 32 and $z$ is 40. The properties are the same as those of the polymer of the formula shown in Example 5.

Larger proportions of formaldehyde in the copolymers according to the present invention yields harder materials; increasing amounts of ethylene imine produce softness, adhesiveness, and solubility in acidic solutions.

The resulting copolymers of high degree of polymerization can be converted not only to filaments and fibers, but also to films, tapes, and other articles which are of a remarkable toughness. Modification of the formaldehyde polymers by ethylene imine considerably improves the dyeability of articles, such as fibers, films and the like made therefrom. Additionally, modification of formaldehyde polymers by ethylene imine allows the polymers to be molded, as, for example, by extrusion.

Of course, many changes and variations in the carbonyl reactants, the cyclic imines, the anionic catalysts, the solvents used, in the reaction conditions, temperature, duration, pressure, in the manner in which the copolymerization products are recovered from the reaction mixture and are purified, in their conversion into films, filaments, fibers, and other articles, and the like may be made by those skilled in the art in accordance with the principles set forth herein and in the claims annexed hereto.

I claim:

1. A high molecular weight copolymerization product of an aldheyde and a cyclic imine, having the formula:

$$[CRH(CH_2)_nCHR'NH(CHR-O)_y]_z$$

where R and R' are selected from the class consisting of hydrogen, lower alkyl radicals, phenyl radicals, and substituted alkyl and phenyl radicals; $n$ is a number from 0 to 4, $y$ is a number from 1 to 199, and $z$ is at least 32, said copolymerization product having a molecular weight of at least 10,000.

2. The copolymerization product of claim 1 having the formula:

$$[CH_2CH_2NH(CH_2O)_y]_z$$

where $y$ is a number from 1 to 199 and $z$ is at least 32.

3. The copolymerization product of claim 2 wherein the ethylene imine is contained in a molar percentage from 10 to 30.

4. The copolymerization product of claim 1 wherein one R is methyl, the other R is hydrogen, R' is hydrogen, and $n$ is 0.

5. The copolymerization product of claim 1 having a molecular weight of at least 20,000 and a mole percentage of cyclic imine between 0.5 and 50 percent.

6. In the process of producing a copolymerization product of an aldehyde and a cyclic imine, the steps which comprise reacting a high purity aldehyde and a high purity cyclic imine in an organic solvent inert to the reactants under the conditions of reaction, at a temperature between about −80° C. and +80° C. in the presence of an anionic catalyst selected from the class consisting of alkyl lithium, aryl lithium, alkyl aluminum, and lithium aluminum hydride, until said copolymerization is completed, and recovering the copolymerization product.

7. The process of claim 6 wherein said aldehyde is formaldehyde and said cyclic imine is ethylene imine.

8. The process of claim 7 wherein said ethylene imine and said formaldehyde are mixed at a temperature of about −75° C., butyl lithium and heptane are added to catalyze the reaction, and the copolymerization is carried out at a temperature between about −75° C. and about −70° C. until copolymerization is completed.

9. The process of claim 6 wherein the organic solvent is selected from the class consisting of liquid aliphatic and aromatic hydrocarbons, and cyclic ethers.

10. The process of claim 6 wherein the aldehyde is selected from the group consisting of formaldehyde and acetaldehyde.

11. The process of claim 6 wherein said cyclic imine is a 1,2-alkylene imine.

No references cited.

WILLIAM H. SHORT, *Primary Examiner.*

H. SCHAIN, *Assistant Examiner.*